United States Patent
Hashimoto et al.

(10) Patent No.: US 6,278,902 B1
(45) Date of Patent: Aug. 21, 2001

(54) ROBOT CONTROL METHOD AND ROBOT CONTROL SYSTEM

(75) Inventors: Yoshiki Hashimoto, Hadano; Minoru Enomoto, Oshino-mura, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/254,289

(22) PCT Filed: Jul. 17, 1998

(86) PCT No.: PCT/JP98/03234

§ 371 Date: Mar. 3, 1999

§ 102(e) Date: Mar. 3, 1999

(87) PCT Pub. No.: WO99/03651

PCT Pub. Date: Jan. 28, 1999

(30) Foreign Application Priority Data

Jul. 17, 1997 (JP) .................................................. 9-207428

(51) Int. Cl.$^7$ ...................................................... G06F 19/00
(52) U.S. Cl. ............................... 700/245; 700/41; 700/42; 700/251; 700/254; 700/262; 700/257; 318/293; 318/567; 318/568.13; 318/599; 901/9; 901/15; 901/20; 901/34; 901/45; 714/14; 714/752; 701/23
(58) Field of Search ...................................... 700/245, 260, 700/45, 41, 42, 251, 262, 187, 188, 189, 254, 257; 318/567, 293, 118, 599, 568.13; 901/9, 15, 20, 34, 45; 714/752, 14

(56) References Cited

U.S. PATENT DOCUMENTS

| | | | |
|---|---|---|---|
| 4,808,063 | * | 2/1989 | Haley ..................................... 414/730 |
| 4,860,215 | * | 8/1989 | Seraji ..................................... 700/260 |
| 4,974,210 | * | 11/1990 | Lee ........................................ 700/260 |
| 5,056,038 | | 10/1991 | Kuno et al. .......................... 700/260 |
| 5,467,003 | * | 11/1995 | Kosaka et al. .................. 318/568.13 |
| 5,731,672 | * | 3/1998 | Miyaguchi .......................... 318/293 |

FOREIGN PATENT DOCUMENTS

| | | |
|---|---|---|
| 2-310609 | 12/1990 | (JP) . |
| 3-251326 | 11/1991 | (JP) . |
| 8-187687 | 7/1996 | (JP) . |
| 8-190415 | 7/1996 | (JP) . |
| 9-91026 | 4/1997 | (JP) . |

OTHER PUBLICATIONS

Daniel et al., Universal Six–Joint Robot Control, IEEE., pp. 31–36, 1988.*
Alhalabi et al., A General Purpose VLSI Chip for Robot Axis Motion Controller, IEEE., pp. 3005–3008, 1992.*
Dr. Hervert Schweizer, Integration Of A Sensor In A Roboter Motion With Fast Reactiions Parallel Processed In Real Time, IEEE., pp. 124–129, 1989.*
Whitcomb et al, Experiments In Adaptive Model–Based Force Control, IEEE., pp. 1846–1853, 1995.*
Geisinger et al., The Design And Development Of A Control System for Tsuper3–776 Robot, IEEE., pp. 333–339, 1993.*
McIntyre et al, Actuators For High Speed High Accuracy, IEEE., pp. 8/1–8/3, 1991.*
Rasmussen, A Single Board Computer For Robot Control, IEEE., pp. 5/1–5/4, 1989.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

A DSP of a servo control circuit obtains a movement value of a servomotor for each axis for each position-speed feedback processing cycle in accordance with a move command value for each axis delivered from a main processor with every distribution cycle, and also obtains a position correction value in accordance with pressure information detected by a sensor. The DSP of the servo control circuit carries out position-speed feedback processing with the use of a move command value which is obtained by correcting the movement value with the obtained position correction value, and drives the servomotor.

4 Claims, 2 Drawing Sheets

PRIOR ART

ROBOT CONTROL METHOD AND ROBOT CONTROL SYSTEM

TECHNICAL FIELD

The present invention relates to a robot control method and a robot control system for correcting robot operation in accordance with information detected by a force sensor.

BACKGROUND ART

Assembling parts by means of a robot, for example, includes operation for fitting the parts with one another. Fitting the parts with one another is difficult if the respective positions of the parts are not settled accurately. In fitting a part held by a robot hand with another part, the parts cannot be easily fitted with each other if there is an error in instruction for the robot or if the positioning accuracy of the other part is poor.

Conventionally, therefore, a method is employed such that the distal end of the wrist of the robot is provided with a force sensor that can detect translation forces in the directions of X-, Y-, and Z-axes, which are perpendicular to one another, and moments around these axes, and that, in inserting one part into the other part, the parts are fitted with one another after the position and attitude of each axis of the robot are corrected according to a pressure detected by the force sensor.

FIG. 2 is a principal-part block diagram of a robot controller for correcting the operation of the robot in accordance with information from the aforesaid sensor.

Numeral 1 denotes a main processor of the robot controller for controlling the robot, and 2 denotes a servo control circuit for drivingly controlling a servomotor 4 for driving each axis of the robot, the circuit 2 being composed of a DSP (digital signal processor). Numeral 3 denotes a servo amplifier that is composed of an inverter or the like. Numeral 4 denotes a servomotor for driving an axis, and 4a denotes a position-speed detector, such as a pulse coder, for detecting the rotational position and speed of the servomotor.

Numeral 6 denotes a sensor, which is attached to, for example, the distal end of the wrist of the robot, as mentioned before. It is a force sensor that can detect translation forces in the directions of X-, Y-, and Z-axes, which are perpendicular to one another, and moments around these axes. Further, numeral 5 denotes a sensor data processing circuit composed of a DSP or the like, which calculates a target acceleration from a pressure detected by the sensor 6 and delivers it to the main processor 1. The main processor 1, servo control circuit 2, and sensor data processing circuit 5 are connected to one another by means of a bus 7.

The main processor 1 successively reads out instruction programs stored in a memory (not shown) or the like, and distributes a move command to the servo control circuit 2 for each robot axis with every predetermined cycle, in order to move a hand or the like attached to the distal end of the wrist of the robot to a move command position at a speed ordered by the programs. The DSP of each servo control circuit 2 carries out position feedback control and speed feedback control in accordance with the move command delivered from the main processor 1 with every predetermined cycle and a position feedback signal and a speed feedback signal fed back from the position-speed detector 4a, and obtains a torque command (current command) for the servomotor 4 for each axis. Further, the DSP detects a current flowing through each servomotor 4 to carry out current feedback control also, and causes the servo amplifier 3 to drive the servomotor 4 for each axis, thereby moving the tool center point of the hand or the like to the command position.

In fitting a part held by a robot hand with another part, on the other hand, the respective fitting positions of the parts may be deviated due to an error in instruction for the robot or poor positioning accuracy. In this case, a reaction force is produced by the dislocation attributable to the fitting operation, and is detected by the sensor 6. This detected pressure is applied to the input of the sensor data processing DSP 5. The DSP of the sensor data processing circuit 5 calculates the target acceleration, which is delivered to the main processor 1.

The main processor 1 calculates position and speed correction values in accordance with the detected acceleration, corrects the speed and position ordered by the instruction programs, and distributes a move command for each distribution cycle to the servo control circuit 2. In consequence, the deviation of the fitting positions is corrected, so that the parts fitting operation can be executed securely.

The above-described conventional method requires the sensor data processing circuit 5 that calculates the target acceleration in accordance with an output signal from the sensor 6, besides the main processor 1 and the DSP of the servo control circuit 2. Although the transmission cycle for acceleration transmitted from the sensor data processing circuit 5 to the main processor 1 can be shortened to, for example, about 500 Hz, moreover, the cycle for the main processor 1 to correct the speed and position in accordance with the received acceleration and distribute the move command to the servo control circuit is predetermined for the distribution of the move command based on the instruction programs, and is at about 50 Hz, for example. In consequence, there is a drawback in that the correction of the deviation of the fitting positions is retarded.

DISCLOSURE OF THE INVENTION

The object of the present invention is to provide a robot control method which can carry out speedy correction of positions based on an output signal from a sensor without requiring the use of any means such as a sensor data processing circuit.

In order to achieve the above object, according to the present invention, information from a sensor is fed back to a servo control circuit for feedback-controlling the position and speed of a robot by means of a processor, in accordance with a move command from a host processor, and a position correction value for each position-speed feedback processing cycle is obtained in accordance with the information from the sensor by means of the processor of the servo control circuit. Then, a move command value for each position-speed feedback processing cycle is corrected in accordance with the correction value, and position-speed feedback control is carried out to correct operation for each axis of the robot.

According to the present invention, therefore, there is no need of providing a sensor data processing circuit that is composed of a DSP, and the sensor output is applied directly to the input of the servo control circuit that is composed of a DSP and corrected by means of the servo control circuit. Thus, the response is improved and the correction of the position and speed, such as the correction of the deviation of the fitting positions, is accelerated, so that the efficiency and speed of the robot action and operation can be improved.

BEST MODE FOR CARRYING OUT THE INVENTION

Figure 1:
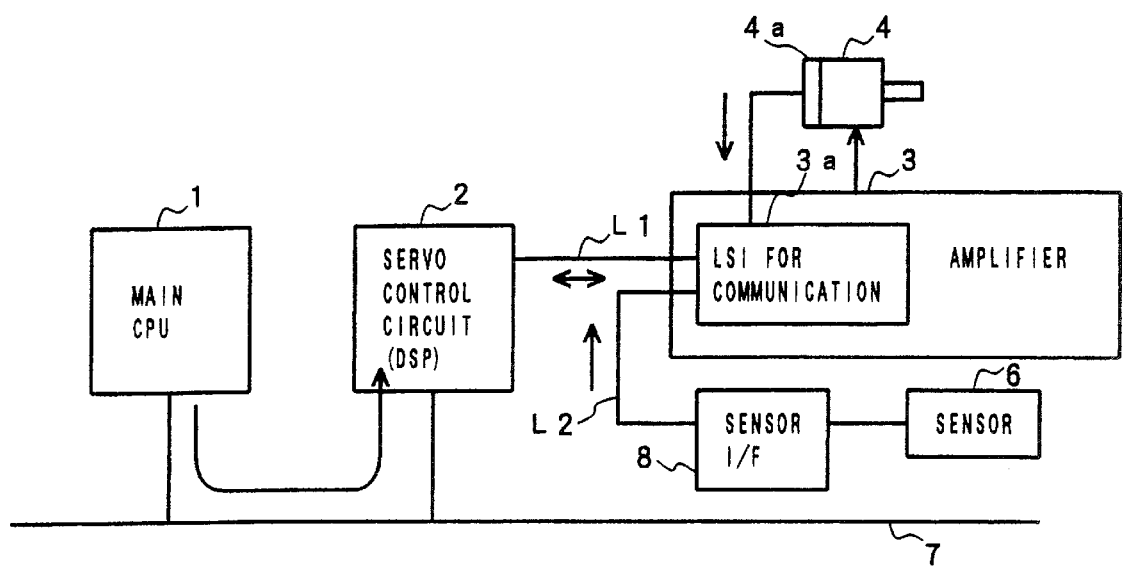
FIG. 1 is a block diagram showing a principal part of one embodiment of a robot controller for carrying out a method of the present invention.

Referring to the block diagram of FIG. 1, there will be described one embodiment of a robot controller for carrying out a robot control method according to the present invention.

A main processor 1 of the robot controller for controlling a robot is connected to a servo control circuit 2, which is composed of a DSP (digital signal processor), by means of a bus 7.

Servomotors 4 for individually driving six axes of the robot are controlled by means of servo amplifiers 3. In FIG. 1, only one servo amplifier 3 and one servomotor 4 are shown, and the other five servo amplifiers 3 and five servomotors 4 are not. The servo amplifier 3 is provided with an LSI 3a for communication.

The DSP of the servo control circuit 2 and the LSI 3a for communication are connected by means of a communication line L1. The communication line L1 is composed of a high-speed serial bus of an optical fiber or the like, and the servo control circuit 2 and the servo amplifier 3 for each axis are connected by the daisy-chain method.

Each servomotor 4 is fitted with a position-speed detector 4a, such as a pulse coder, for detecting the rotational position and speed of the servomotor.

Output signals from a sensor 6, such as a 6-axis force sensor that can detect translation forces in the directions of X-, Y-, and Z-axes, which are perpendicular to one another, and moments around these axes, are applied to the LSI 3a for communication through a sensor interface 8. The LSI 3a for communication is connected to the sensor interface 8 by means of a communication line L2. The communication line L2 is composed of a high-speed serial bus of an optical fiber or the like.

The main processor 1 reads out instruction programs stored in a memory (not shown) or the like block by block, and delivers a move command for each robot axis to the servo control circuit 2 with every distribution cycle (e.g., cycle of 50 Hz) in accordance with an ordered speed and position.

The DSP of the servo control circuit 2 executes the following processes.

(1) The DSP divides a distributed move command value for each axis received from the main processor 1 into movement values for individual position-speed feedback processing cycles (e.g., cycles of 4 kHz), thereby obtaining a move command value for each position-speed feedback processing cycle.

(2) The DSP obtains a target acceleration in accordance with pressure information that is detected by means of the aforesaid sensor 6 and fed back via the sensor interface 8, communication line L2, LSI 3a for communication, and communication line L1. Based on the obtained target acceleration, the DSP calculates a position correction value for each position-speed feedback processing cycle.

(3) Using this position correction value, the DSP corrects the move command value for each position-speed feedback processing cycle.

(4) The DSP carries out position-speed feedback control to obtain a torque command (current command) for the servomotor 4 for each axis, in accordance with the corrected move command value for each position-speed feedback processing cycle and position-speed feedback information that is detected by means of the position-speed detector 4a attached to each servomotor 4 and fed back via the LSI 3a for communication and the communication line L1.

(5) The DSP carries out current feedback processing to obtain a current command for each phase of each servomotor, in accordance with the torque command and a feedback current for each phase that is detected by means of a current detector (not shown) and fed through the LSI 3a for communication and the communication line L1 and flows through each servomotor 4, and sends the current command to the LSI 3a for communication via the communication line L1.

Figure 2:
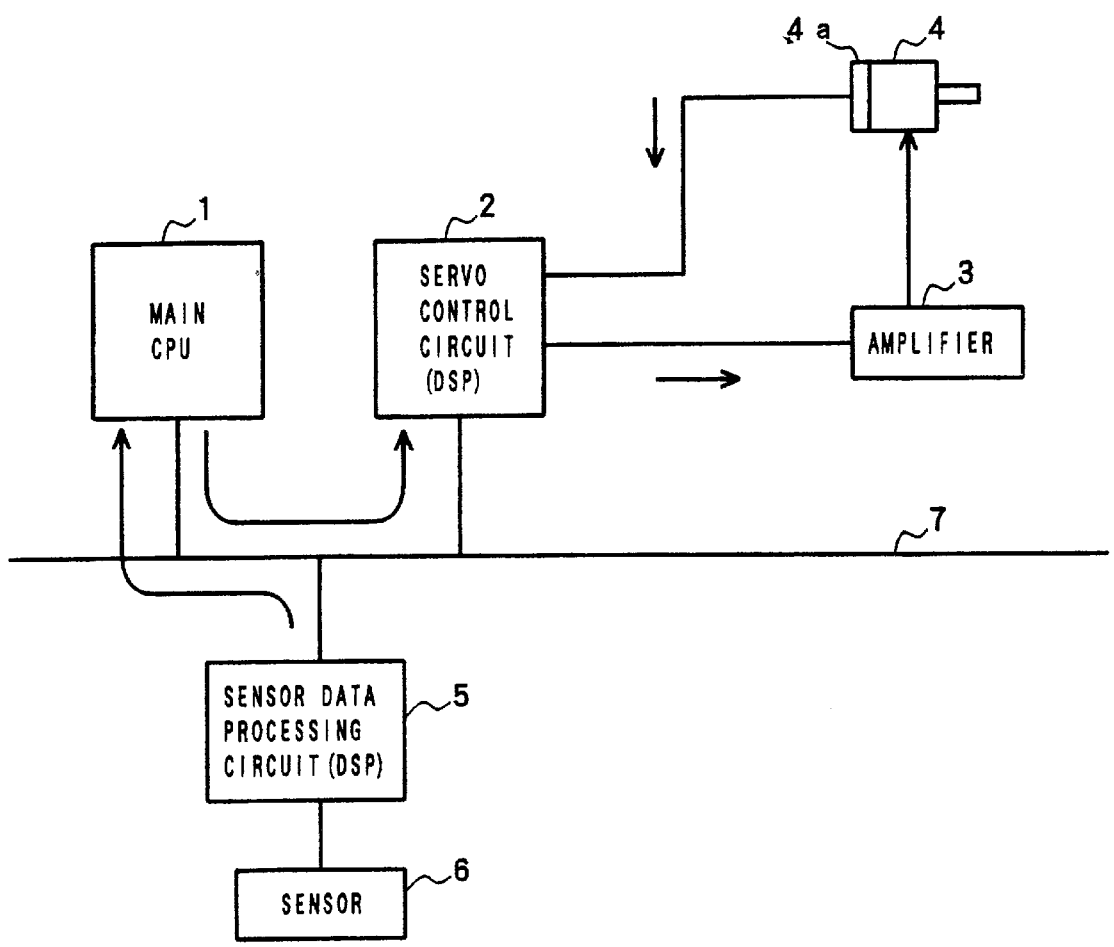
FIG. 2 is a block diagram showing a principal part of an example of a robot controller for carrying out a conventional method.

Among the above-described processes executed by the DSP of the servo control circuit 2, the processes (1), (4) and (5) are the same or substantially the same as the servo control processes executed by the DSP of the conventional servo control circuit. Further, the process (2) is equivalent to the process that is conventionally executed by the DSP of the sensor data processing circuit 5 (see FIG. 2) and the main processor 1. The present invention differs from the prior art in that this process is improved so that it can be executed by means of the DSP of the servo control circuit 2. Furthermore, the process (3) is a process that is newly added according to the present invention.

On the side of the servo amplifiers 3, on the other hand, the servo amplifier 3 for each axis receives a current command for each corresponding phase and actuates an inverter or the like, thereby drivingly controlling each servomotor 4.

As described above, the DSP of the servo control circuit 2 for position-speed feedback control carries out the correction process by obtaining the position correction value in accordance with the pressure information detected by means of the sensor 6. It is unnecessary, therefore, to provide a sensor data processing DSP or the like, which is essential to the conventional method (see FIG. 2). Moreover, this position correction is executed with every position-speed feedback processing cycle that is executed by the DSP of the servo control circuit 2, so that the time which starts with detection of pressure by means of the sensor 6 and end with execution of the position correction is very short. Thus, speedier robot operation can be executed.

If the cycle of distribution of each move command from the main processor 1 to the servo control circuit 2 and the current command transferred to each servo amplifier 3 with every positionspeed feedback processing cycle are 50 Hz and 4 kHz, for example, respectively, the position correction is carried out only with every 20 ms $(=(1/50)\times1{,}000)$ in the conventional method. According to the present invention, however, the position correction is carried out quickly with every 0.25 ms $(=(1/4{,}000)\times1{,}000)$.

What is claimed is:

1. A robot control method for correcting an operation of a robot in accordance with information from a sensor, comprising:

feeding back the information from said sensor to a servo control circuit for feedback-controlling the position and speed of the robot using a processor, in accordance with a move command from a host processor;

obtaining a position correction value for a position-speed feedback processing cycle in accordance with the information from the sensor with the processor in said servo control circuit;

correcting a move command value for the position-speed feedback processing cycle in accordance with said position correction value; and performing position-speed feedback control correcting operation for an axis of the robot.

2. A robot control system comprising:

a servo control circuit having a dedicated DSP for digitally controlling a servo amplifier for controlling a servomotor for driving an axis of a robot;

a main processor for giving a move command for the robot axis to said servo control circuit during a first cycle;

a pulse coder connected to the DSP of said servo control circuit by high-speed serial communication and attached to said servomotor; and a force sensor connected to the DSP of said servo control circuit by high-speed serial communication, wherein the DSP of said servo control circuit divides said move command value for the first cycle into a move command value for a second cycle and converts pressure information delivered from said force sensor into a position correction value for the second cycle, wherein the move command value for the second cycle is corrected with use of the position correction value for the second cycle, and position-speed feedback control is performed in accordance with the corrected move command value for the second cycle and position-speed information delivered from said pulse coder.

3. A robot control system for a robot, comprising:

a servomotor driving an axis of the robot;

a servoamplifier to drive the servomotor;

a servo control circuit including a dedicated digital signal processor, the digital signal processor digitally controlling the servo amplifier to drive the servomotor;

a main processor issuing a move command instructing movement of the axis of the robot to the digital signal processor during a first cycle;

a position and speed detector detecting a position and speed of the servomotor, the position and speed detector providing position and speed information to the digital signal processor;

a force sensor sensing force and mounted to the robot, the force sensor being connected to the digital signal processor, wherein the digital signal processor divides a move command value for the first cycle into a move command value for a second cycle, and converts force information from the force sensor into a position correction value for the second cycle, and wherein the digital signal processor corrects the move command value for the second cycle using the position correction value for the second cycle, and position-speed feedback control is performed in accordance with the corrected move command value for the second cycle and position and speed information from the position and speed detector.

4. A robot control system for a robot, comprising:

a force sensor sensing force attached to a distal end of the robot, the force sensor sensing force;

a main processor including movement commands stored therein controlling robot position and speed; and a servo control circuit including a dedicated digital signal processor, wherein the servo control circuit receives a movement command from the main processor and force information representing a force sensed by the force sensor, the dedicated digital signal processor corrects the movement command based on the force information, and issues a corrected movement command based on the force information to control the robot.

* * * * *